(12) United States Patent
Schlepple et al.

(10) Patent No.: US 12,504,590 B2
(45) Date of Patent: Dec. 23, 2025

(54) OPTICAL WAFER-LEVEL PACKAGE

(71) Applicant: Cisco Technology, Inc., San Jose, CA (US)

(72) Inventors: Norbert Schlepple, Macungie, PA (US); Aparna R. Prasad, San Jose, CA (US); Vipulkumar K. Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 18/061,881

(22) Filed: Dec. 5, 2022

(65) Prior Publication Data

US 2024/0184066 A1    Jun. 6, 2024

(51) Int. Cl.
*G02B 6/42*     (2006.01)
*G02B 6/43*     (2006.01)
(Continued)

(52) U.S. Cl.
CPC ......... *G02B 6/4239* (2013.01); *G02B 6/4214* (2013.01); *G02B 6/4218* (2013.01); *G02B 6/4238* (2013.01); *G02B 6/4245* (2013.01); *G02B 6/4246* (2013.01); *G02B 6/4255* (2013.01); *G02B 6/4257* (2013.01); *G02B 6/426* (2013.01); *G02B 6/428* (2013.01); *G02B 6/43* (2013.01); *H01L 25/167* (2013.01); *H04B 10/40* (2013.01)

(58) Field of Classification Search
CPC .. G02B 6/4214; G02B 6/4218; G02B 6/4238; G02B 6/4239; G02B 6/4245; G02B 6/4246; G02B 6/4255; G02B 6/4257; G02B 6/426; G02B 6/428; G02B 6/43; H01L 25/167; H04B 10/40
See application file for complete search history.

(56) References Cited

U.S. PATENT DOCUMENTS 9,057,853 B2 *  6/2015  Lau ........................... G02B 6/43
9,177,884 B2 * 11/2015  Schunk .................... H01L 24/19
(Continued)

FOREIGN PATENT DOCUMENTS

CN    206271704 U    6/2017
KR    20190108298 A    9/2019
WO    2022071710 A1    4/2022

OTHER PUBLICATIONS

International Search Report and Written Opinion for International Application No. PCT/US2023/080390, mailed Apr. 9, 2024, 17 Pages.

*Primary Examiner* — Ryan A Lepisto
(74) *Attorney, Agent, or Firm* — Patterson + Sheridan, LLP

(57) ABSTRACT

In a first embodiment aspect presented in this disclosure, an optical wafer-level (OWL) package includes a frontside electrical redistribution layer (RDL) and a molding compound layer, the OWL package further including at least one of (1) an optical transmitter at least partially embedded within the molding compound layer and electrically coupled to the frontside electrical RDL, the optical transmitter arranged for providing an optically modulated output data signal; or (2) an optical receiver at least partially embedded within the molding compound layer and electrically coupled to the frontside electrical RDL, the optical receiver arranged for receiving an optically modulated input data signal.

32 Claims, 11 Drawing Sheets

(51) Int. Cl.
*H01L 25/16* (2023.01)
*H04B 10/40* (2013.01)

(56) References Cited

U.S. PATENT DOCUMENTS

| | | | | |
|---|---|---|---|---|
| 9,305,908 | B2* | 4/2016 | Krabe | H01L 24/25 |
| 9,541,717 | B2* | 1/2017 | Krabe | H10H 20/01 |
| 9,791,640 | B2* | 10/2017 | Bowen | G02B 6/423 |
| 9,798,087 | B1 | 10/2017 | Mathai et al. | |
| 11,493,689 | B2* | 11/2022 | Yu | G02B 6/1225 |
| 11,973,074 | B2* | 4/2024 | Yu | H10F 77/93 |
| 2013/0164867 | A1* | 6/2013 | Ramasamy | H01L 25/167 |
| | | | | 257/E33.059 |
| 2020/0200987 | A1 | 6/2020 | Kim et al. | |
| 2020/0310052 | A1 | 10/2020 | Lim et al. | |
| 2021/0066883 | A1 | 3/2021 | Ng et al. | |
| 2021/0202562 | A1 | 7/2021 | Chang et al. | |
| 2022/0140154 | A1 | 5/2022 | Tuncer | |
| 2023/0099534 | A1* | 3/2023 | Wu | H01L 23/5384 |
| | | | | 257/686 |
| 2023/0122292 | A1* | 4/2023 | Lin | H01L 25/0657 |
| | | | | 257/668 |

\* cited by examiner

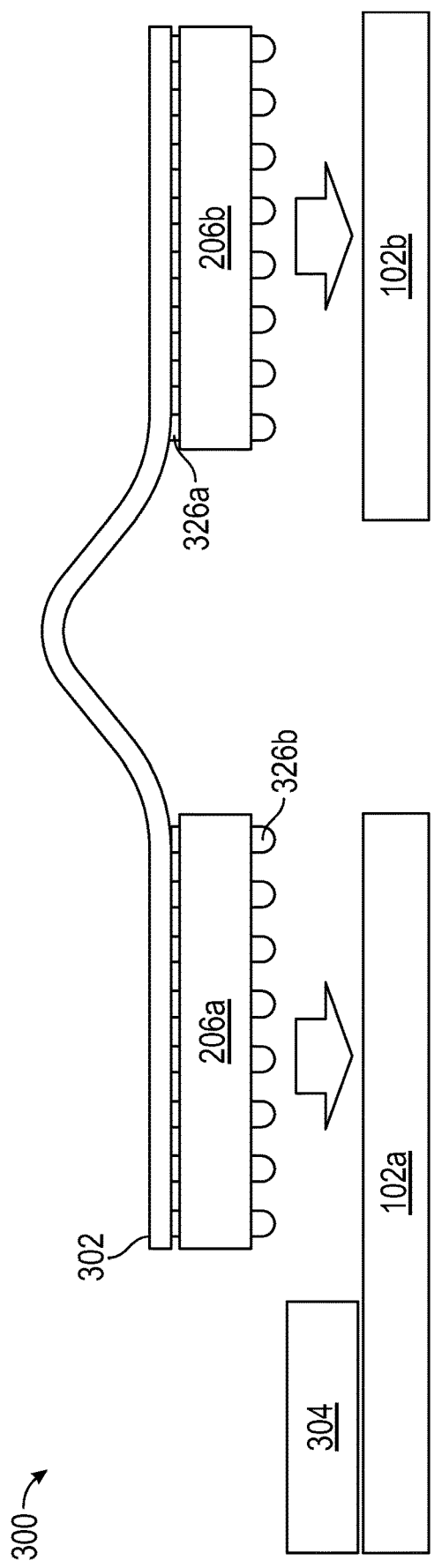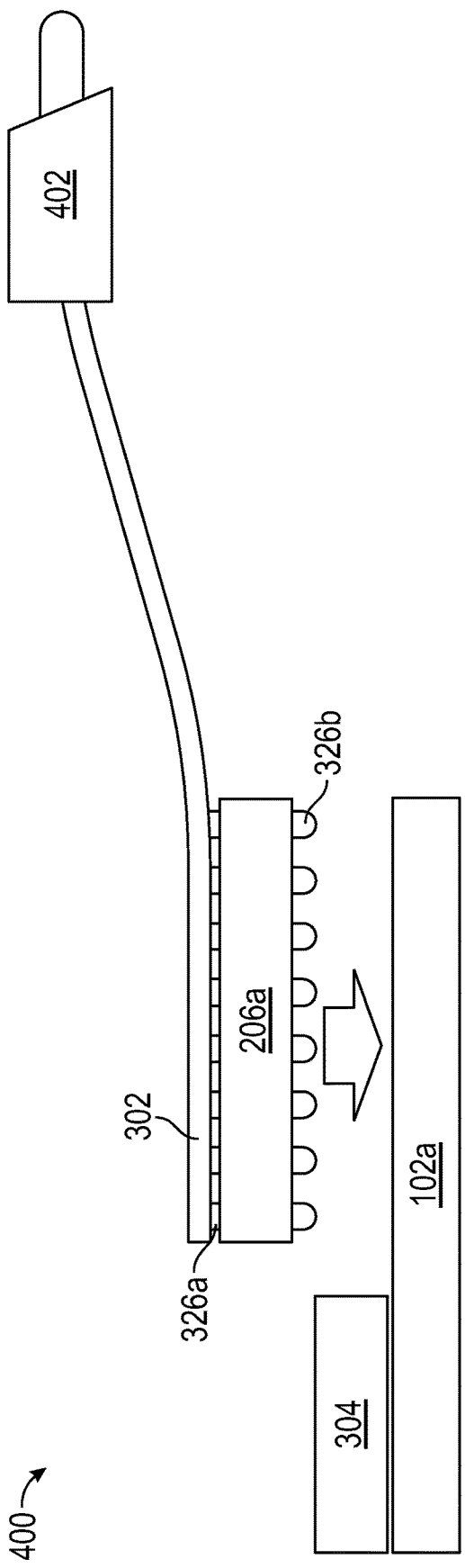

OPTICAL WAFER-LEVEL PACKAGE

TECHNICAL FIELD

Embodiments presented in this disclosure generally relate to opto-electronics. More specifically, embodiments disclosed herein relate to wafer-level opto-electronic packages.

BACKGROUND

As the data rates increase, compact integration of opto-electronic components of a transceiver is challenging. For example, conventional wire bond electrical connections between optical and electrical ICs require tighter (shorter) length tolerances for signal integrity of high-bandwidth signals, which constrains package assembly design.

Further, high-bandwidth signals also tighten alignment tolerance for optical components of a transceiver. This problem is compounded for transceivers that include multiple fiber channels (e.g., 4×100 Gbs; 2×4×100 Gbs).

Thus, improvements to the manufacturability and functionality of high-bandwidth opto-electronic packages are desired.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 depicts an example of an optical system.

FIG. 4 depicts an example of an optical system.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
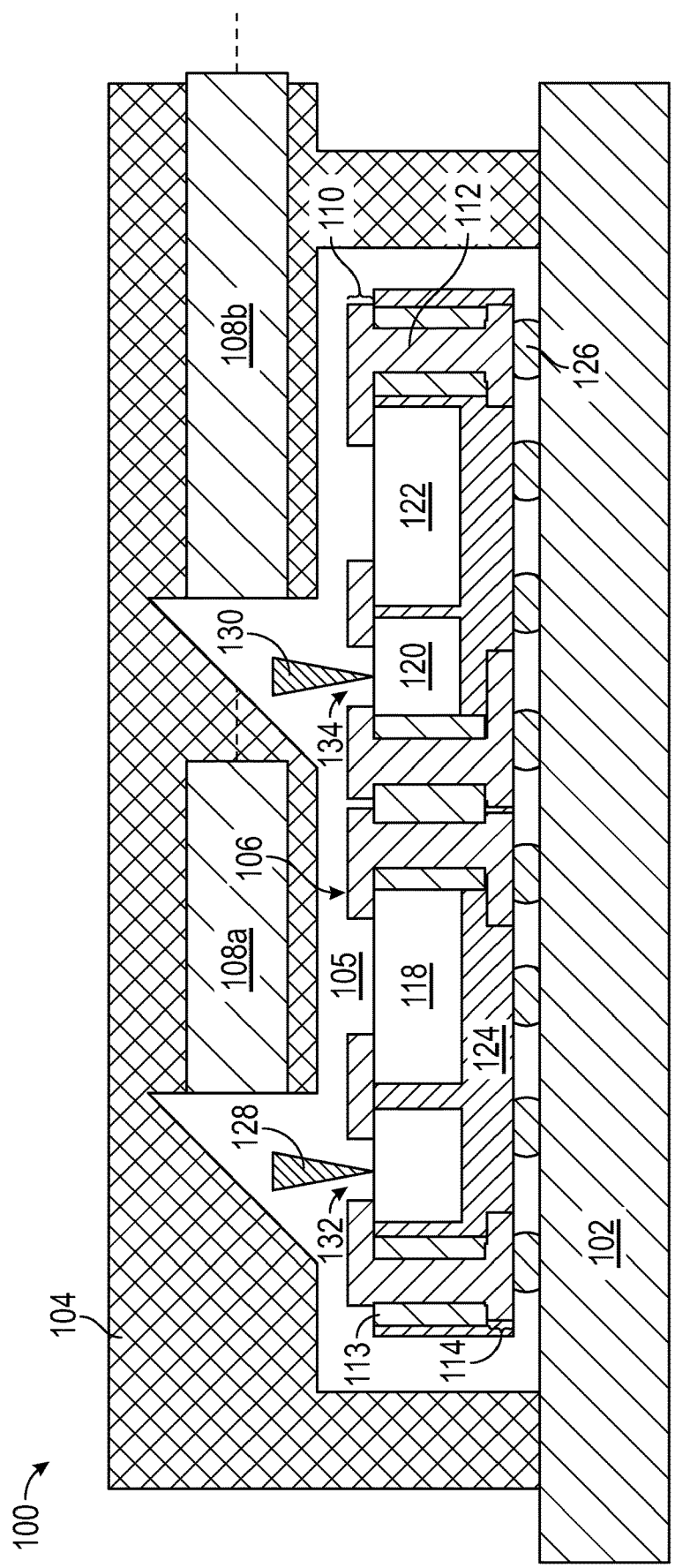
FIG. 1 is a cross-sectional view of an example optical assembly.

In a first embodiment aspect presented in this disclosure, an optical wafer-level (OWL) package includes a frontside electrical redistribution layer (RDL) and a molding compound layer, the optical wafer-level package further including at least one of (1) an optical transmitter at least partially embedded within the molding compound layer and electrically coupled to the frontside electrical RDL, the optical transmitter arranged for providing an optically modulated output data signal; or (2) an optical receiver at least partially embedded within the molding compound layer and electrically coupled to the frontside electrical RDL, the optical receiver arranged for receiving an optically modulated input data signal.

In one aspect, in combination with any example OWL package above or below, the optical wafer-level package further includes a backside electrical redistribution layer (RDL) electrically coupled to the frontside electrical RDL, wherein at least one of the optical transmitter and the optical receiver is arranged between the frontside electrical RDL and the backside electrical RDL.

In one aspect, in combination with any example OWL package above or below, at least one of the optical transmitter and the optical receiver are fully embedded within the molding compound layer. In one aspect, in combination with any example OWL package above or below, the molding compound layer includes an epoxy molding material. In one aspect, in combination with any example OWL package above or below, the molding compound layer includes a material that is at least substantially transparent for at least a wavelength of one of the optically modulated output data signal and the optically modulated input data signal.

In one aspect, in combination with any example OWL package above or below, the optical transmitter includes a laser that is arranged for providing the optically modulated output data signal and the optical receiver includes a photodiode that is arranged for receiving the optically modulated input data signal. In one aspect, in combination with any example OWL package above or below, the laser includes a vertical-cavity surface-emitting laser.

In one aspect, in combination with any example OWL package above or below, the optical transmitter further includes a driver that is electrically coupled, via the frontside electrical RDL, to the laser, and the optical receiver further includes an amplifier that is electrically coupled, via the frontside electrical RDL, to the photodiode.

In one aspect, in combination with any example OWL package above or below, the OWL package further includes a backside electrical redistribution layer (RDL) electrically coupled to the frontside electrical RDL, wherein the laser, the photodiode, the driver, and the amplifier are arranged between the frontside electrical RDL and the backside electrical RDL.

In one aspect, in combination with any example OWL package above or below, the optical transmitter includes a multi-channel optical transmitter that is arranged for providing optically modulated output data signals and the optical receiver includes a multi-channel optical receiver that is arranged for receiving optically modulated input data signals.

In one aspect, in combination with any example OWL package above or below, at least one of the optical transmitter and the optical receiver are mechanically coupled to the frontside electrical RDL. In one aspect, in combination with any example OWL package above or below, the frontside electrical RDL at least partially defines at least one of (1) a transmitter aperture for the optical transmitter and (2) a receiver aperture for the optical receiver.

In one aspect, in combination with any example OWL package above or below, the OWL package further includes a transparent element arranged within at least one of the transmitter aperture and the receiver aperture. In one aspect, in combination with any example OWL package above or below, the OWL package further includes at least one of (1) a transmitter optic optically coupled to the optical transmitter and (2) a receiver optic optically coupled to the optical receiver.

In one aspect, in combination with any example OWL package above or below, the OWL package further includes at least one of (1) optical transmitters at least partially embedded within the molding compound layer and electrically coupled to the frontside electrical RDL, each optical transmitter arranged for providing a respective optically modulated output data signal and (2) optical receivers at least partially embedded within the molding compound layer and electrically coupled to the frontside electrical RDL, each optical receiver arranged for receiving a respective optically modulated input data signal.

In one aspect, in combination with any example OWL package above or below, the OWL package is adapted to optically couple with a waveguide. In one aspect, in combination with any example OWL package above or below, the OWL package is adapted to optically couple with a planar lightwave circuit.

In one aspect, in combination with any example OWL package above or below, the backside electrical RDL is arranged to electrically couple with a circuit substrate. In one aspect, in combination with any example OWL package above or below, the OWL package further includes an interposer that is optically coupled with at least one of the optical transmitter and the optical receiver. In one aspect, in combination with any example OWL package above or below, the interposer is mechanically coupled to the frontside electrical RDL.

In one aspect, in combination with any example OWL package above or below, the OWL package further includes vias arranged within the molding compound layer, the vias electrically coupling the frontside electrical RDL with the backside electrical RDL. In one aspect, in combination with any example OWL package above or below, the OWL package further includes an optical adhesive arranged on or above the frontside electrical RDL.

In one aspect, in combination with any example OWL package above or below, the OWL package includes an optical chip-scale package, the optical chip-scale package including the frontside electrical RDL, the molding compound layer, and at least one of the optical transmitter and the optical receiver.

In a second embodiment aspect presented in this disclosure, an optical assembly includes (1) an optical waveguide and (2) an optical wafer-level (OWL) package optically coupled to the optical waveguide, the optical wafer-level package including a frontside electrical redistribution layer (RDL) and a molding compound layer. The OWL package further including at least one of (1) an optical transmitter at least partially embedded within the molding compound layer, optically coupled to the optical waveguide, and electrically coupled to the frontside electrical RDL, the optical transmitter arranged to provide an optically modulated output data signal to the optical waveguide or (2) an optical receiver at least partially embedded within the molding compound layer, optically coupled to the optical waveguide, and electrically coupled to the frontside electrical RDL, the optical receiver arranged to receive an optically modulated input data signal from the optical waveguide.

In one aspect, in combination with any example optical assembly above or below, the optical waveguide includes a first optical fiber optically coupled to the optical transmitter and a second optical fiber optically coupled to the optical receiver. In one aspect, in combination with any example optical assembly above or below, the optical assembly further includes a mold that is mechanically coupled to the first optical fiber and the second optical fiber.

In one aspect, in combination with any example optical assembly above or below, the optical assembly further includes an optical substrate that includes the optical waveguide and the optical wafer-level package is mechanically coupled to the optical substrate. In one aspect, in combination with any example optical assembly above or below, the optical assembly further includes a planar lightwave circuit that includes the optical substrate.

In one aspect, in combination with any example optical assembly above or below, the optical assembly further includes an interposer that is optically coupled with at least one of the optical transmitter and the optical receiver and mechanically coupled to the frontside electrical RDL.

Second embodiment optical assembly aspects presented in this disclosure may be combined with first embodiment OWL package aspects presented in this disclosure.

In a third embodiment aspect presented in this disclosure, a method includes applying a molding compound to a plurality of opto-electronic dies, each opto-electronic die arranged with a respective optically active surface facing a carrier; applying a respective backside electrical redistribution layer (RDL) to each opto-electronic die; exposing, by removing the carrier, the respective optically active surfaces; applying a respective frontside electrical redistribution layer (RDL) to each opto-electronic die; and separating, by cutting the molding compound, the plurality of opto-electronic dies into individual opto-electronic dies.

In one aspect, in combination with any example method above or below, the method further includes coupling a respective frontside electrical RDL of at least one of the individual opto-electronic dies with at least an optical substrate, the coupling including at least one of mechanically coupling and electrically coupling the respective frontside electrical RDL with the optical substrate.

In one aspect, in combination with any example method above or below, the method further includes coupling a respective backside electrical RDL of at least one of the individual opto-electronic dies with at least a circuit substrate, the coupling including at least one of mechanically coupling and electrically coupling the respective backside electrical RDL with the circuit substrate.

In one aspect, in combination with any example method above or below, the applying the molding compound includes applying an optically transparent molding compound to the plurality of opto-electronic dies.

Example Embodiments

A wafer-level package is a type of integrated circuit package such as a chip-scale package. In one aspect, a wafer-level and/or chip-scale package is provided by a process where at least some components are attached to or otherwise formed in a die before the wafer is diced. In one aspect, a chip-scale package may have an area (e.g., footprint) that is equal or less than 1.2 times that of the die footprint. In one aspect, a wafer-level and/or chip-scale package may be a single-die package that is directly mountable on a substrate such as a circuit substrate (e.g., a PCB). In one aspect, a wafer-level and/or chip-scale package includes a solder ball pitch that is equal or less than 1 mm. As used herein, "optical waveguide" and "waveguide" are used interchangeably.

The below wafer-level package embodiments provide several advantages. In one aspect, accurate alignment of optical components of wafer-level packages may be achieved by processing multiple opto-electronic dies. For example, in one aspect, a frontside (or top) of respective optical wafer-level packages can be mechanically and/or electrically coupled to an optical substrate (e.g., an interposer, waveguide, optical fiber, and/or PLC) and a backside (or bottom) of the respective packages can be mechanically and/or electrically coupled to circuit substrate, thereby simplifying assembly. In one aspect, an electric redistribution layer is used instead of wire bonds, thereby avoiding or minimizing signal integrity issues associated with wire bonds while increasing the level of integration of an optical wafer-level package. In one aspect, a substantially clear molding compound, with respect to optical data signal wavelengths, may be applied directly on an active optical surface of an optical wafer-level package, thereby partially defining, via the molding compound, an optical channel that may interface with an optical substrate.

FIG. 1 is a cross-sectional view of optical assembly 100. In one aspect, optical assembly 100 includes circuit substrate 102, which is mechanically coupled to mold 104. Circuit substrate 102 may be printed circuit board (PCB), among other examples. Mold 104 may be mechanically coupled to optical fibers 108a and 108b. Optical wafer-level package 106 (e.g., an optical chip-scale package) may be arranged within cavity 105, which is at least partially defined by circuit substrate 102 and mold 104. Package 106 includes optical transmitter 116, driver 118, optical receiver 120, and amplifier 122 (e.g., active components), which are each partially embedded in molding compound layer 124.

Molding compound layer 124 may be an epoxy molding compound. In one aspect, molding compound layer 124 is a transparent compound layer (e.g., a transparent epoxy molding compound layer) that efficiently passes wavelengths of the optically modulated output data signal 128 and/or optically modulated input data signal 130. In one aspect, molding compound layer 124 includes optically opaque material with desirable mechanical and/or thermal properties.

Optical transmitter 116, driver 118, optical receiver 120, and amplifier 122 are shown to be electrically coupled to frontside electrical redistribution layer (RDL) 110. In one aspect, optical transmitter 116, driver 118, optical receiver 120, and amplifier 122 are directly or indirectly mechanically coupled to frontside electrical RDL 110.

Figure 8:
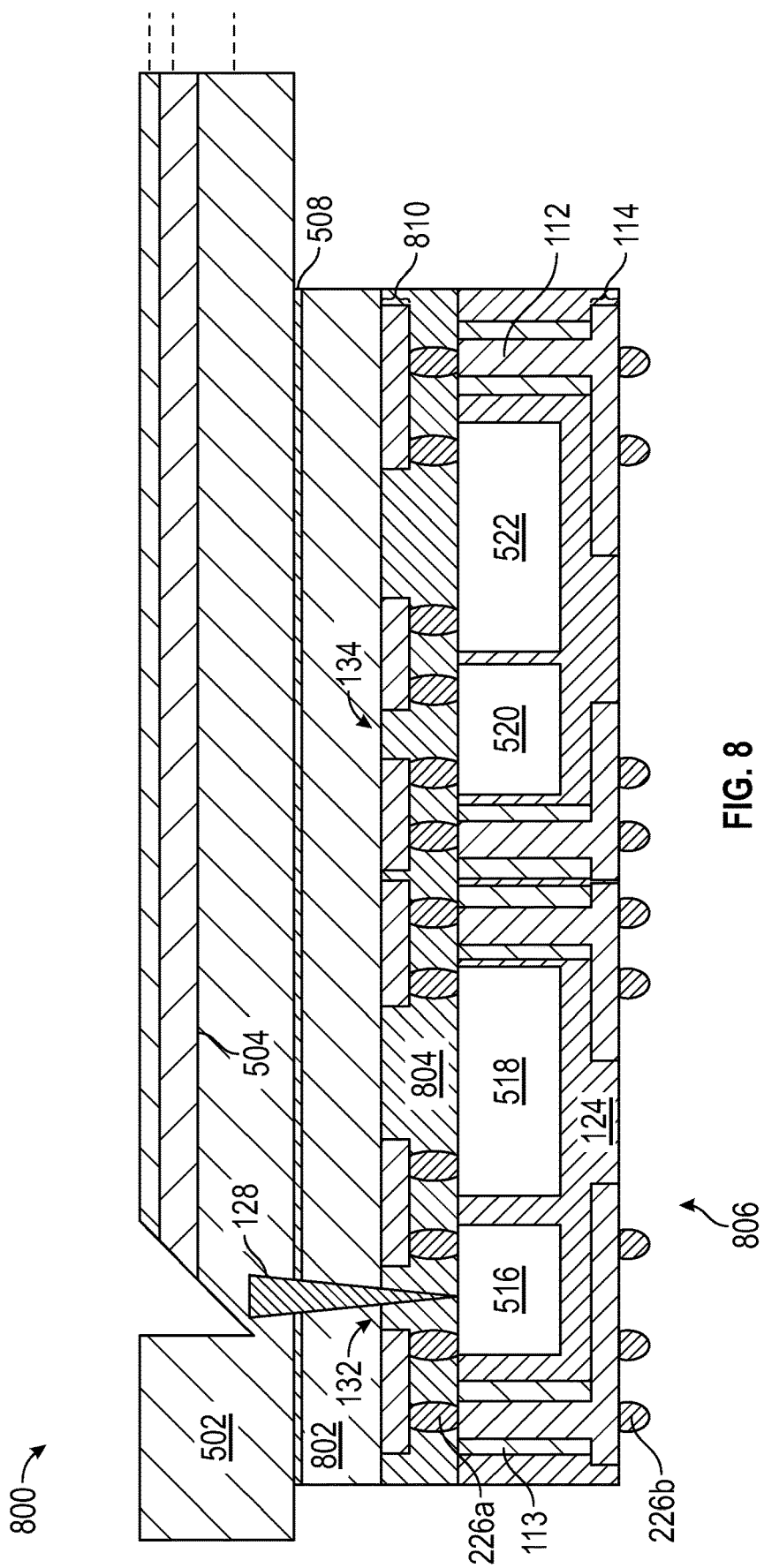
FIG. 8 is a cross-sectional view of an example optical assembly.

For example, frontside electrical RDL 110 may be directly arranged on one or more of the active components of package 106 such as optical transmitter 116, driver 118, optical receiver 120, and/or amplifier 122. In one aspect, solder and/or other electrically coupling material (e.g., an under-bump metallization layer) may be arranged between an active component and a frontside electrical RDL, as shown in FIG. 8, thereby establishing an indirect mechanical coupling between a frontside electrical RDL and an active component. In one aspect, frontside electrical RDL 110 (at least partially) defines transmitter aperture 132 and receiver aperture 134, which respectively pass optically modulated output data signal 128 and optically modulated input data signal 130. In one aspect, optical transmitter 116 and/or optical receiver 120 define an optical aperture (not shown) that is arranged along an axis that extends through at least the optical aperture of a transmitter 116 or receiver 120 and a respective transmitter aperture 132 and receiver aperture 134 (i.e., the apertures may be substantially aligned).

Package 106 may include one or more optical transmitters 116, each arranged in communication with a corresponding optical fiber 108a (e.g., in a 1-to-1 or many-to-1 arrangement). Each transmitter 116 may transmit one or more optical wavelengths of optically modulated data as optically modulated output data signal 128. In one aspect, optical fiber 108a receives a plurality of optical channels of data from a multi-channel optical transmitter. An example optical transmitter 116 includes a laser such as a vertical-cavity surface-emitting laser (VCSEL). In one aspect, driver 118 is an integrated circuit that drives one or more optical transmitters 116 for providing one or more channels or wavelengths of optically modulated data. Example data rates of optically modulated output data signal 128 include 100 Gigabits per second and/or multiples thereof.

Package 106 may include one or more optical receivers 120, each arranged in communication with a corresponding optical fiber 108b. Each receiver 120 may receive one or more optical wavelengths of optically modulated data as optically modulated input data signal 130. In one aspect, optical fiber 108b provides a plurality of optical channels of data that are received by a multi-channel optical receiver (e.g., a multi-channel photodiode). An example optical receiver 120 includes a photodiode. In one aspect, amplifier 122 is a transimpedance amplifier. Example data rates of optically modulated input data signal 130 include 100 Gigabits per second and/or multiples thereof.

Package 106 may further include backside electrical RDL 114, which may be electrically and mechanically coupled to circuit substrate 102 via solder 126. As shown in FIGS. 3 and 4, a circuit substrate may operably couple an optical wafer-level package with other active components that may also be arranged on a shared circuit substrate or another, operably coupled circuit substrate. Example active components include integrated circuits such as programmable memory (e.g., ASICs and/or FPGAs).

Inserts 113 (e.g., e-bar and/or circuit board material) may mechanically couple vias 112 with molding compound layer 124. Vias 112 electrically couple frontside electrical RDL 110 and backside electrical RDL 114. Backside electrical RDL 114 may be electrically coupled to circuit substrate 102 via solder 126.

Figure 2:
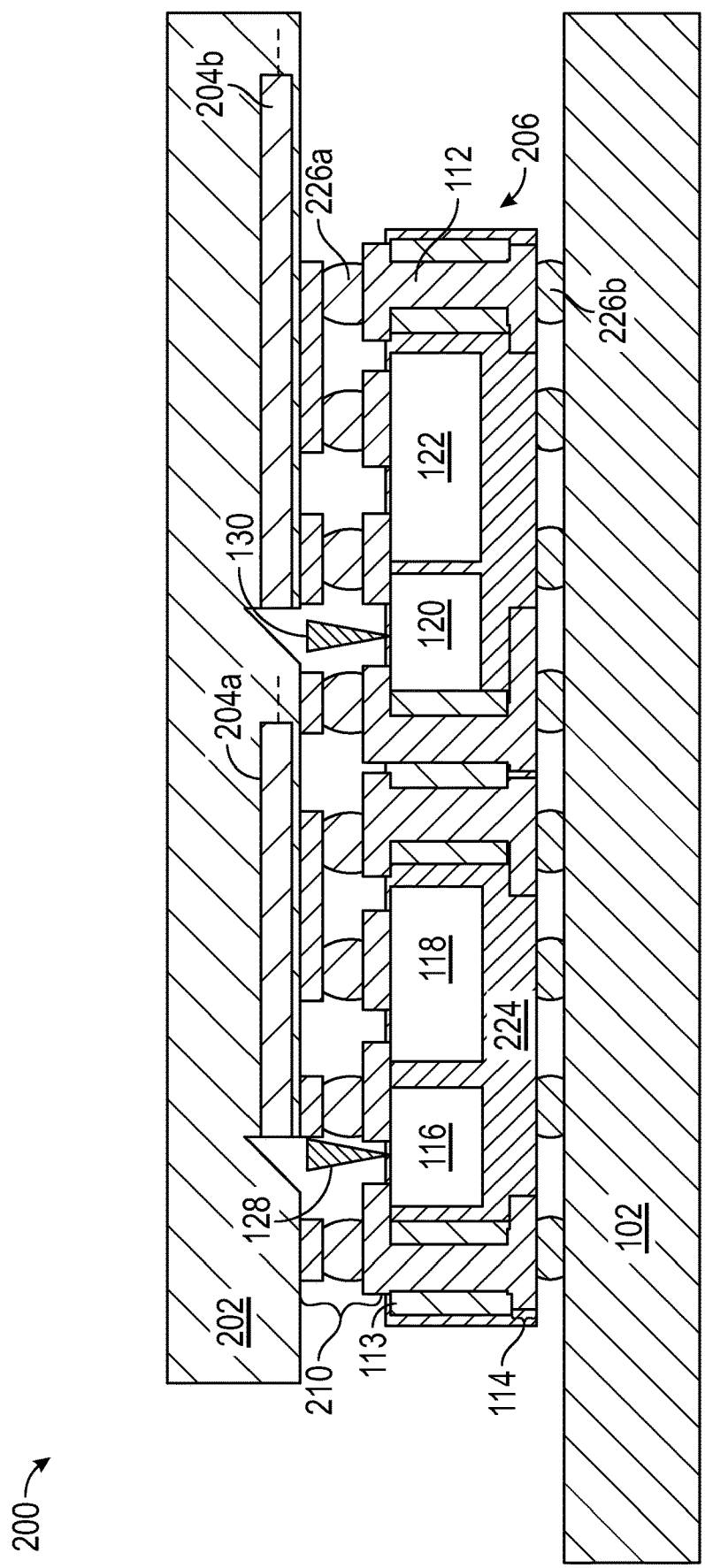
FIG. 2 is a cross-sectional view of an example optical assembly.

FIG. 2 is a cross-sectional view of optical assembly 200. In one aspect, optical wafer-level package 206 may include hierarchical solder 226a and 226b. Hierarchical solder 226a is arranged between each layer of bilayer frontside electrical RDL 210. Hierarchical solder 226b is arranged between backside electrical RDL 114 and circuit substrate 102. Optical substrate 202 may be a glass or polymer substrate or a composite or otherwise a combination thereof. In one aspect, optical substrate 202 is a planar lightwave circuit (PLC), which includes integrated waveguides 204a and 204b.

In contrast to package 106 of FIG. 1 with its active components being partially embedded into molding compound layer 124, FIG. 2 shows optical transmitter 116, driver 118, optical receiver 120, and/or amplifier 122 fully embedded into molding compound 224. In one aspect, molding compound layer 224 may include a material that is at least substantially transparent for at least a wavelength of one of optically modulated output data signal 128 and the optically modulated input data signal 130. In one aspect, molding compound layer 224 includes a transparent epoxy molding material. An example material includes SolEpoxy™ OP1000, which passes wavelengths ranging at least from under 400 nm to 1600 nm.

FIG. 3 shows optical system 300, which may include, in one aspect, wafer-level package 206a and 206b as illustrated in FIG. 2. Each package 206a and 206b may be mechanically coupled to flexible PLC 302 via hierarchical solder 326a. Hierarchical solder 326b may both mechanically and electrically couple packages 206a and 206b, respectively, to circuit substrates 102a and 102b. Programmable memory 304 may thereby electrically coupled to package 206a. In one aspect, programmable memory 304 may be an ASIC (application-specific integrated circuit) or an FPGA (field-programmable gate array) programed to provide, process, and receive electrical data signals from and to package 206a.

FIG. 4 shows optical system 400, which includes optical connector 402 for coupling with, for example, an optical port. Optical connector 402 may be one of a Lucent™ connector, standard connector, ST connector, ferrule core, multi-position optical connector, and MT-RJ connector. Optical connector 402 may transmit and/or receive optical data signals.

Figure 5:
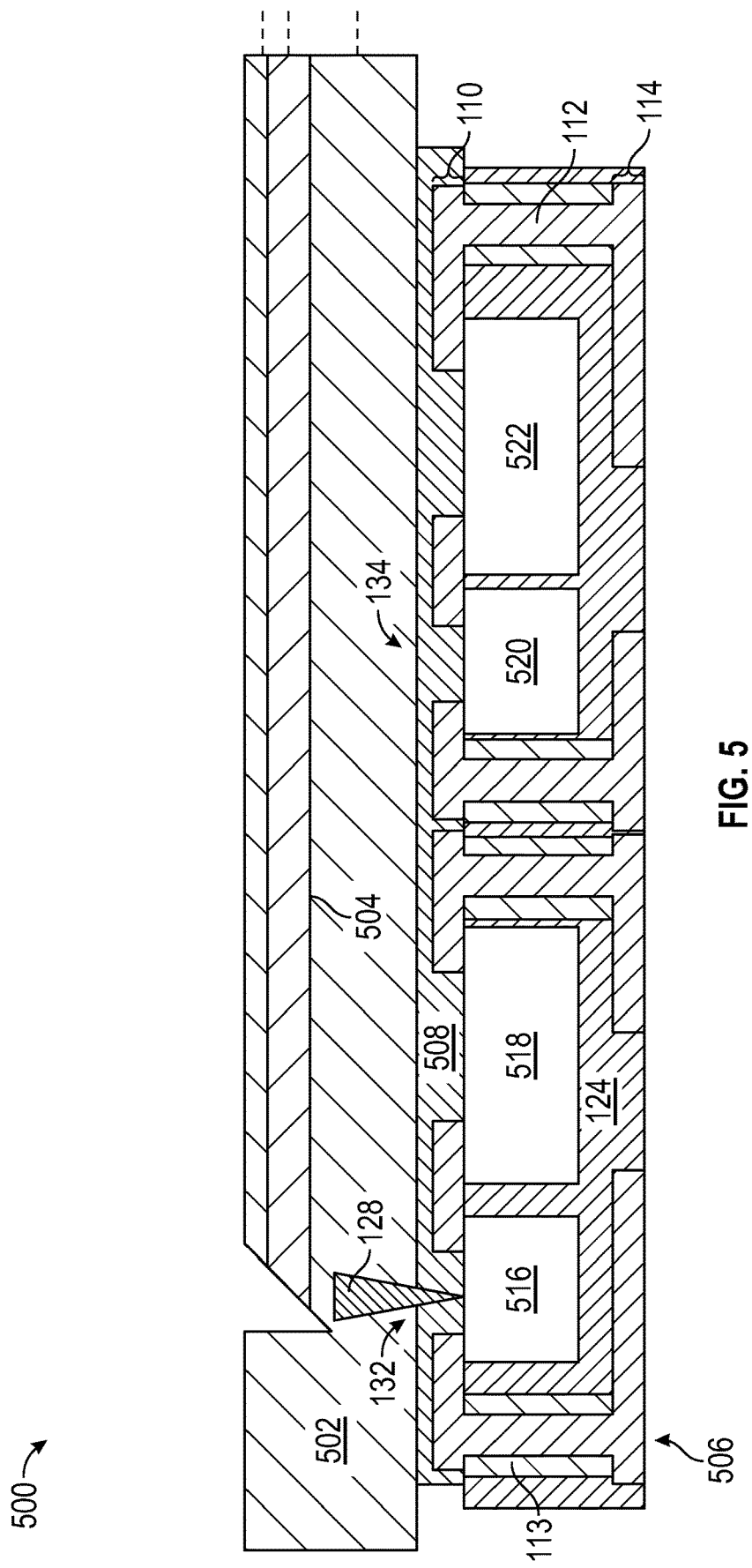
FIG. 5 is a cross-sectional view of an example optical assembly.

FIG. 5 is a cross-sectional view of optical assembly 500. In one aspect, assembly 500 may include optical adhesive 508 that is arranged between PLC 502 and optical wafer-level package 506, thereby mechanically and optically coupling PLC 502 and package 506. Package 506 may further include VCSEL 516, which is electrically coupled, via frontside electrical RDL 110, to driver IC 518. Package 506 may further include photodiode 520, which is electrically coupled, via frontside electrical RDL 110, to transimpedance amplifier 522. At least one of the VCSEL 516 and photodiode 520 is optically coupled waveguide 504 of PLC 502. Photodiode 520 may be optically coupled to another waveguide (not shown) that may be arranged in parallel to waveguide 504. PLC 502 may include an optical or glass material or a composite or other combination thereof.

Figure 6A:
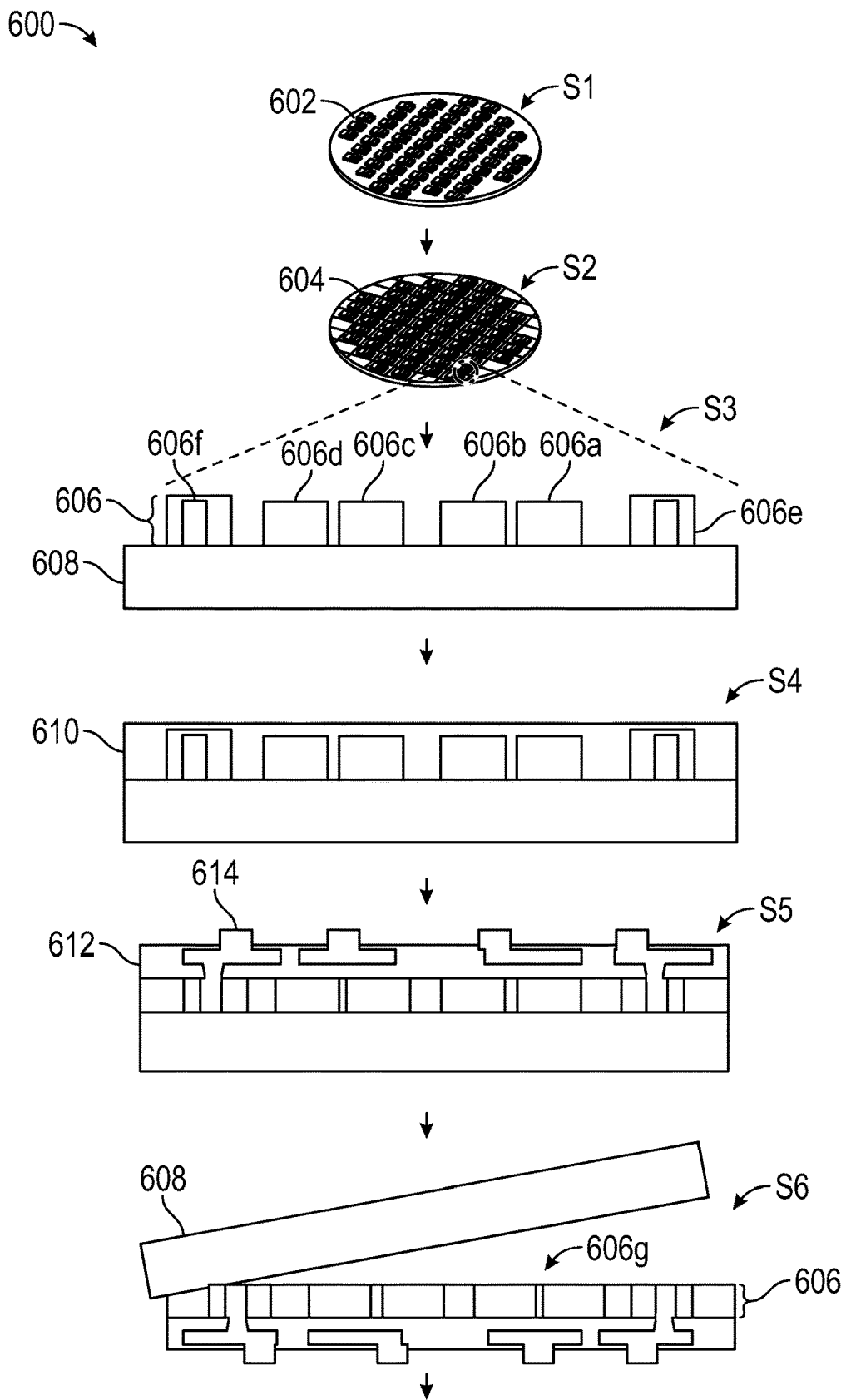
FIGS. 6A and 6B depict an example manufacturing sequence for an optical assembly.
Figure 6B:
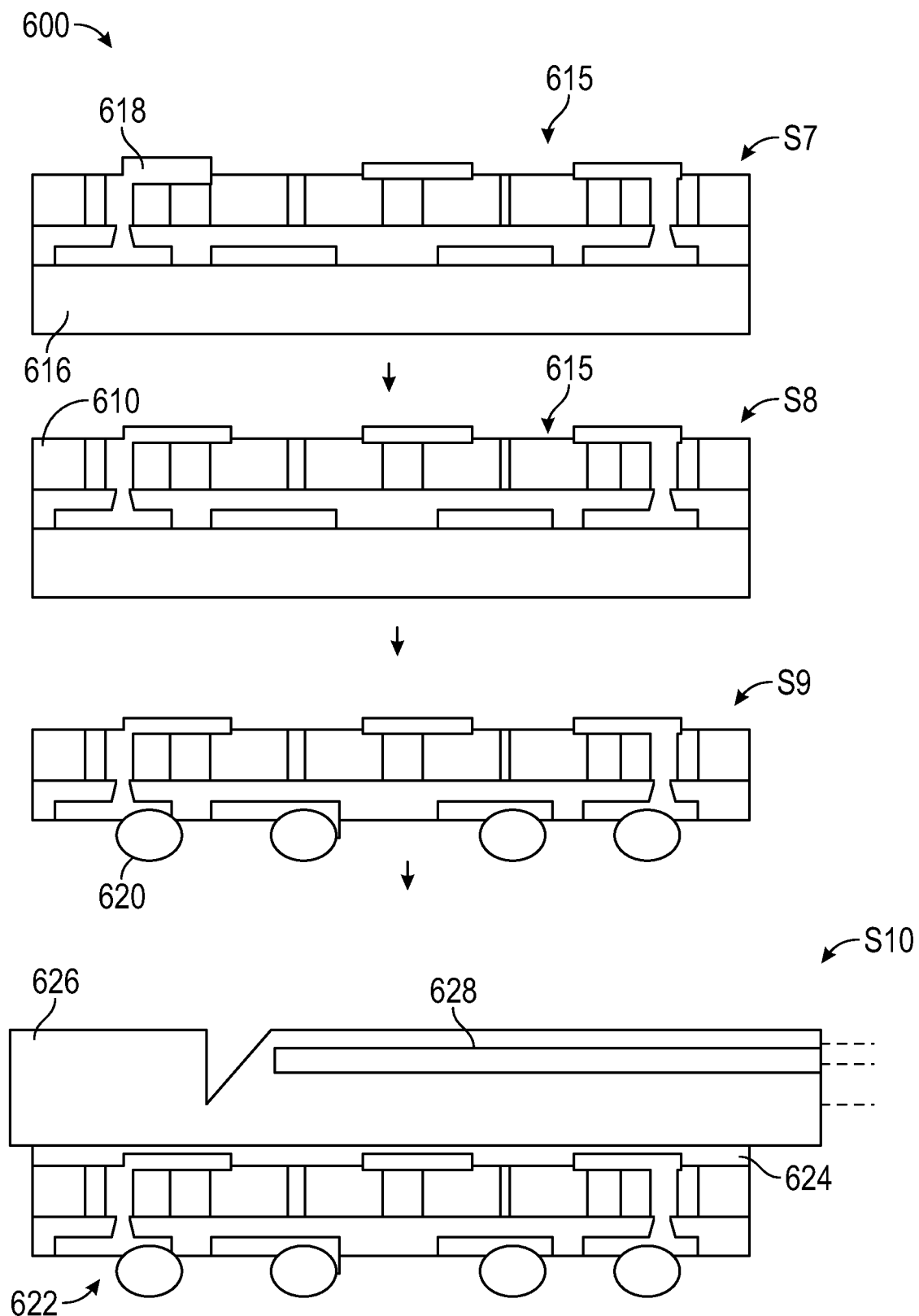

FIGS. 6A and 6B show manufacturing sequence 600 for providing optical assembly 622. Step S1 may include providing wafer 602, which may be populated with active components, inserts, and vias, for example. S2 may include dicing or singulation of wafer 602 into a plurality of optoelectronic dies 604, which is the focus of the subsequent steps.

S3 may include a reconstitution process in which the diced dies 604, and thus the components thereof that reside in component layer 606, are placed with the front side down on, for example, sticky tape (not shown) that is arranged on steel carrier 608. Component layer 606 may include active components 606a, 606b, 606c, and 606d, with one or more optical emitters and/or transmitters facing carrier 608. Component layer 606 may further include an organic substrate (not shown) that is directly or indirectly mechanically coupled to inserts 606e and vias 606f.

S4 may include applying molding compound 610 to component layer 606 and then backgrinding (not shown) compound 610 to expose vias 606f. S5 may include adding under-bump metallization (UBM) layer 612 and backside electrical RDL 614. In one aspect, a bi-layer backside electrical RDL may further include solderable pads (not shown). A particular advantage of sequences S4 and S5 is that active components 606a, 606b, 606c, and/or 606d, by facing downward towards carrier 608, may be substantially free of contamination from dielectric or metal layers or resist contamination for steps S4 and S5.

S6 may include turning and removing steel carrier 608, thereby exposing respective optically active surface 606g of component layer 606. S7 may include placing optical wafer-level package 615, frontside up, on carrier 616 and adding a frontside electrical RDL 618. Sequence S8 may include separating (e.g., singulation or dicing) the individual packages 615 by cutting through molding compound 610 and removal (not shown) of the individual packages 615 from carrier 616, thereby providing individual opto-electronic dies.

S9 may include applying ball grid array 620, which may be an electrical and mechanical interface for a circuit substrate (not shown). Additionally or alternatively, a low-temperature solder may be applied (not shown). In one aspect, S9 may be performed before and/or during S8. S10 may include applying optical adhesive 624 and PLC 626, thereby providing optical assembly 622. PLC 626 may include optical waveguide 628.

Figure 7:
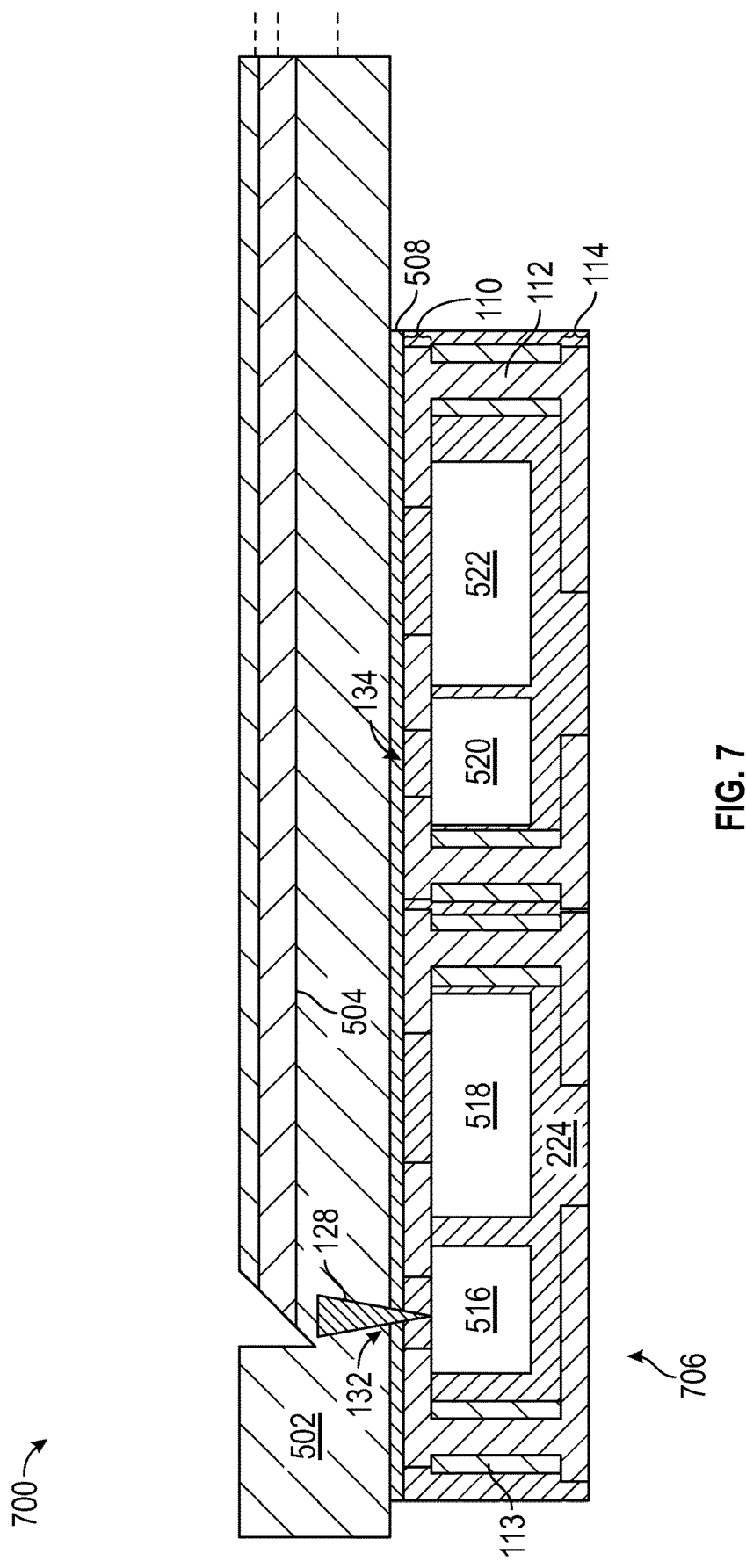
FIG. 7 is a cross-sectional view of an example optical assembly.

FIG. 7 is a cross-sectional view of optical assembly 700. In one aspect, optical wafer-level package 706 is arranged such that VCSEL 516, driver IC 518, photodiode 520, and transimpedance amplifier 522 are fully embedded in molding compound layer 224. As such, compound 224 may partially define an optical channel for optically modulated output data signal 128 and/or optically modulated input data signal 130 to pass through.

FIG. 8 is a cross-sectional view of optical assembly 800. Optical assembly 800 may include, in one aspect, interposer 802 arranged between PLC 502 and wafer-level optical package 806. In one aspect, interposer 802 may be an element of package 806. Alternatively, interposer 802 may be a component of PLC 502 or other optical substrate. Assembly 800 may be manufactured using one or more steps of sequence 600 of FIGS. 6A and 6B, but differs in fully embedding one or more active components of package 806 into molding compound layer 224.

Interposer 802 may be a glass interposer. In one aspect, frontside electrical RDL 810 may be mechanically coupled to interposer 802. For example, frontside electrical RDL 810 may be deposited onto interposer 802 to fully define frontside electrical RDL 110 or define a layer of a multi-layer frontside electrical RDL. Underfill layer 804 may include an optically transparent material and interfaces interposer 802 with package 806. Optical adhesive 508 interfaces interposer 802 with PLC 502.

Figure 9:
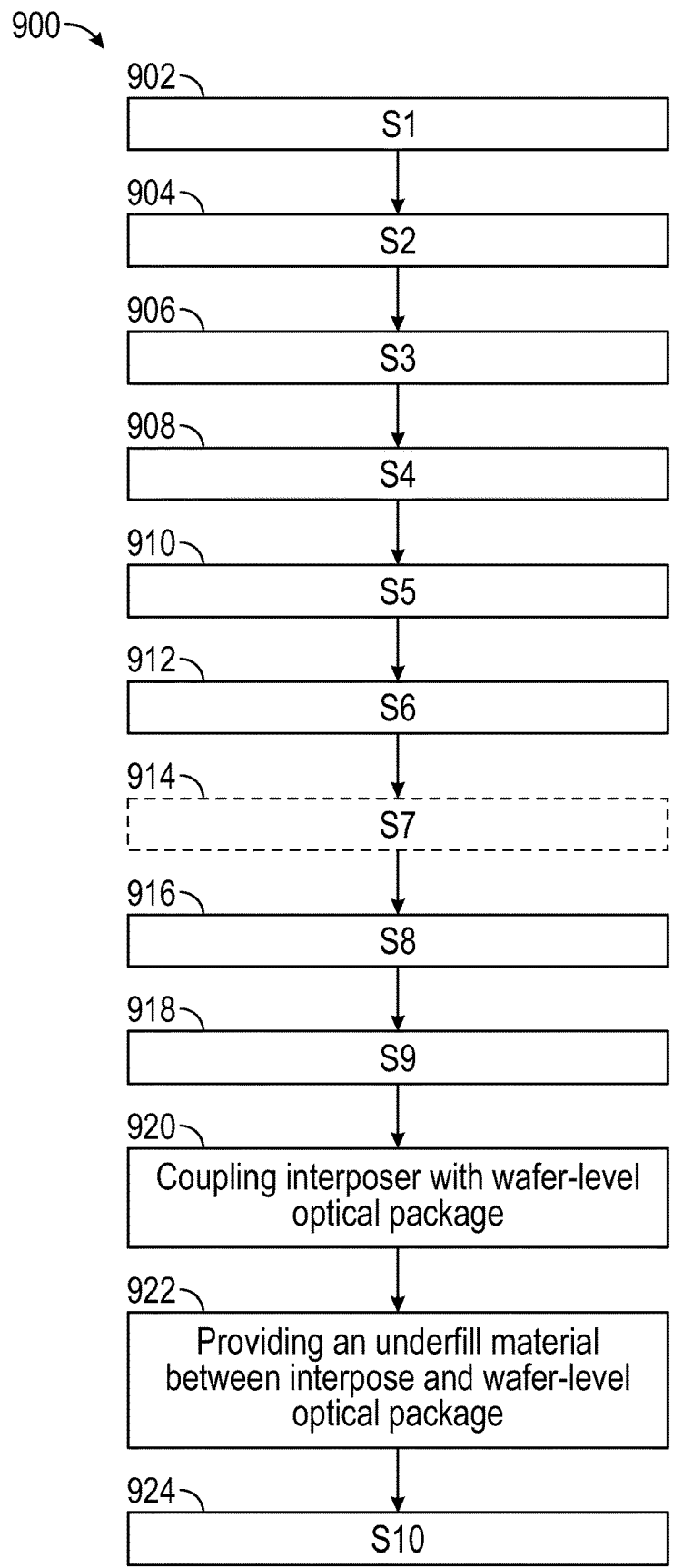
FIG. 9 depicts an example method for manufacturing an optical assembly.

FIG. 9 depicts method 900 for manufacturing optical assembly 800. Blocks 902, 904, 906, 908, 910, and 912 may respectively include steps S1, S2, S3, S4, S5, and S6 of FIG. 6A. In one aspect, block 914 is optional as S7 may not be performed because interposer 802 includes frontside electrical RDL 810. Alternatively, for multi-layer frontside electrical RDLs, S7 is performed such that, for example, a lower layer of a frontside electrical RDL is electrically coupled to frontside electrical RDL 810 in later steps.

Blocks 916 and 918 may respectively include steps S8 and S9 of FIG. 6B. Block 920 includes coupling interposer 802 with package 806. In one aspect, interposer 802 is mechanically and electrically coupled to package 806 via low melting-point solder. Block 922 includes providing an underfill material (e.g., underfill layer 804) between interposer 802 and package 806. Block 924 includes step S10 of FIG. 6B, thereby providing optical assembly 800.

Figure 10:
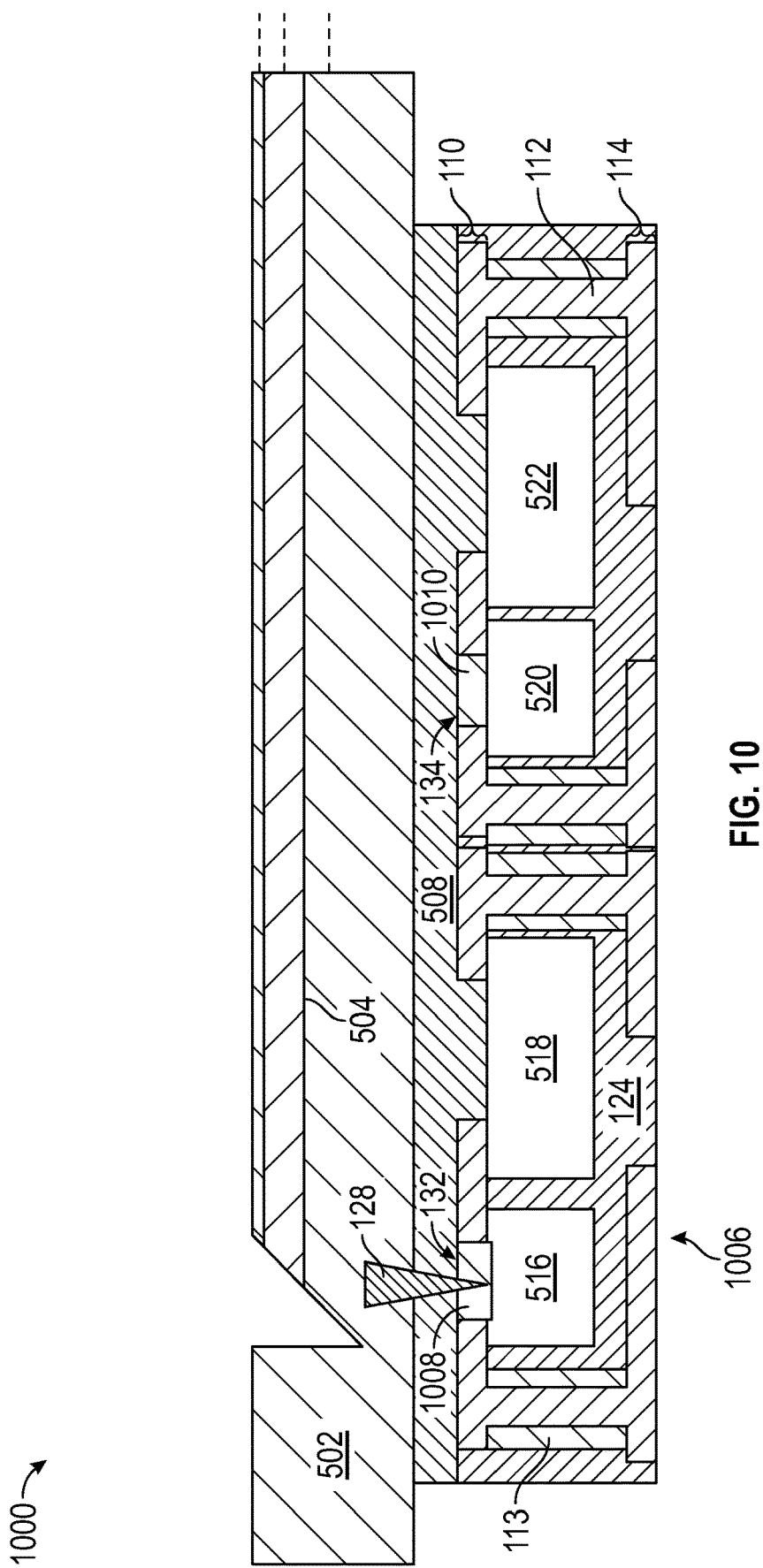
FIG. 10 is a cross-sectional view of an example optical assembly.

FIG. 10 is a cross-sectional view of optical assembly 1000. In one aspect, wafer-level package 1006 may include transparent elements 1008 and 1010, which may respectively partially define an optical channel for VCSEL 516 and photodiode 520. In one aspect, transparent elements 1008 and 1010 are respectively arranged within transmitter aperture 132 and receiver aperture 134. In one aspect, transparent elements 1008 and 1010 may be transparent spacers, effectively arranged as an underfill between optical adhesive 508 and, respectively, VCSEL 516 and photodiode 520. In one aspect, transparent elements 1008 and 1010 may include an optic. For example, transmitter optic (e.g., transparent element 1008) and/or a receiver optic (e.g., transparent element 1010) may be a lens with or without optical power. Optic examples include miniature lenses, gradient-index (GRIN) lenses, and/or meta-optic lenses.

Figure 11:
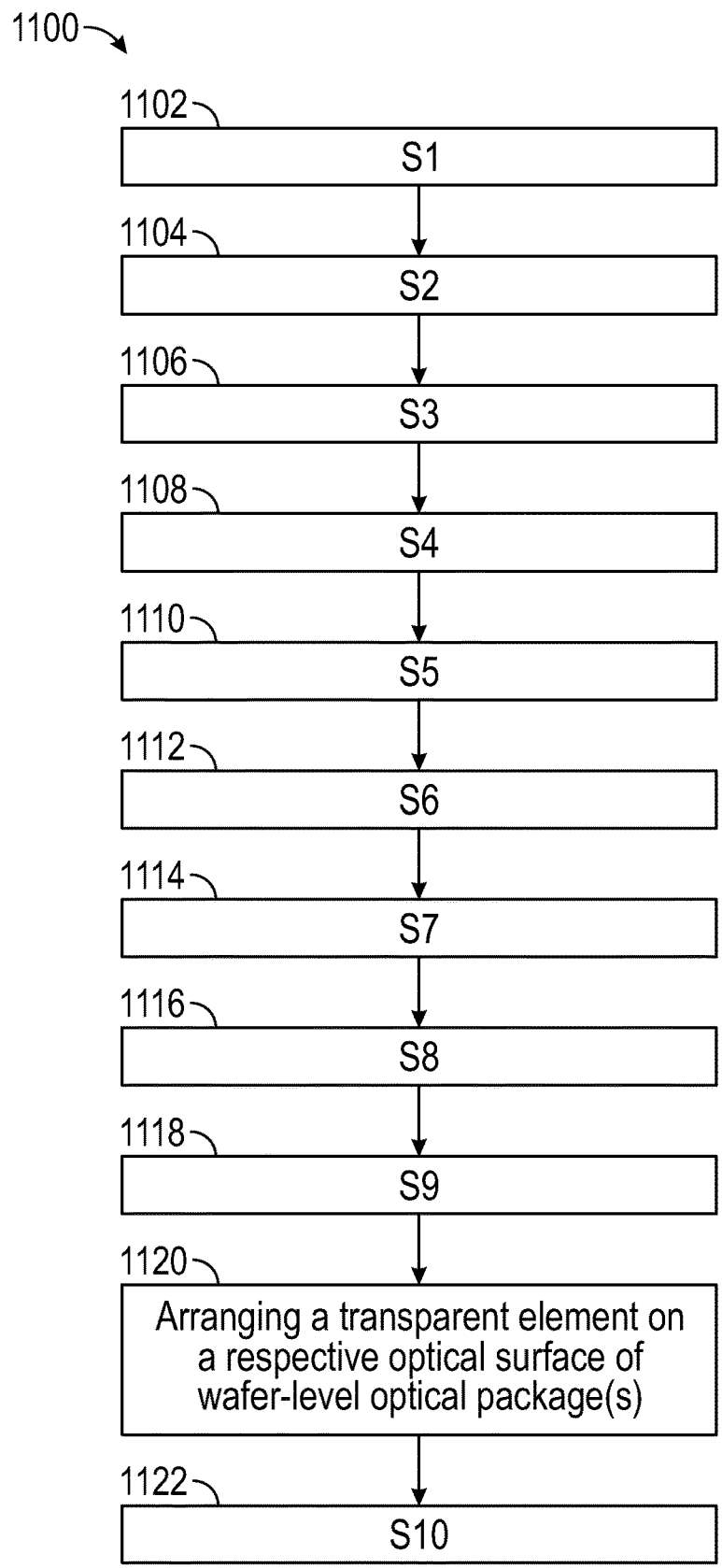
FIG. 11 is an example method for manufacturing an optical assembly.

FIG. 11 depicts method 1100 for manufacturing optical assembly 1000. Blocks 1102, 1104, 1106, 1108, 1110, and 1112 may respectively include steps S1, S2, S3, S4, S5, and S6 of FIG. 6A. Blocks 1114, 1116, and 1118 may respectively include steps S7, S8, and S9 of FIG. 6B. Block 1120 includes arranging a transparent element (e.g., transparent elements 1108 and/or 1010) on a respective optically active surface of wafer-level package 1006. Example optically active surfaces may be an optically transmitting surface of VCSEL 516 and/or an optically receiving surface of photodiode 520. Block 1122 includes step S10 of FIG. 6B, thereby providing optical assembly 800.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical wafer-level package comprising:
a frontside electrical redistribution layer (RDL);
a molding compound layer, the optical wafer-level package further comprising at least one of:
an optical transmitter at least partially embedded within the molding compound layer and electrically coupled to the frontside electrical RDL, the optical transmitter arranged for providing an optically modulated output data signal; or
an optical receiver at least partially embedded within the molding compound layer and electrically coupled to the frontside electrical RDL, the optical receiver arranged for receiving an optically modulated input data signal; and
a backside electrical RDL electrically coupled on one end to the frontside electrical RDL by vias and on another end to a circuit substrate via solder, wherein at least one of the optical transmitter and the optical receiver is arranged between the frontside electrical RDL and the backside electrical RDL and wherein the backside electrical RDL is separated from the at least one of the optical transmitter and the optical receiver by the molding compound layer.

2. The optical wafer-level package of claim 1, wherein at least one of the optical transmitter and the optical receiver are fully embedded within the molding compound layer.

3. The optical wafer-level package of claim 1, wherein the molding compound layer comprises an epoxy molding material.

4. The optical wafer-level package of claim 1, wherein the molding compound layer comprises a material that is at least substantially transparent for at least a wavelength of one of the optically modulated output data signal and the optically modulated input data signal.

5. The optical wafer-level package of claim 1, wherein the optical transmitter comprises a laser that is arranged for providing the optically modulated output data signal and the optical receiver comprises a photodiode that is arranged for receiving the optically modulated input data signal.

6. The optical wafer-level package of claim 5, wherein the laser comprises a vertical-cavity surface-emitting laser.

7. The optical wafer-level package of claim 5, wherein the optical transmitter further comprises a driver that is electrically coupled, via the frontside electrical RDL, to the laser, and the optical receiver further comprises an amplifier that is electrically coupled, via the frontside electrical RDL, to the photodiode.

8. The optical wafer-level package of claim 7, further comprising a backside electrical redistribution layer (RDL) electrically coupled to the frontside electrical RDL, wherein the laser, the photodiode, the driver, and the amplifier are arranged between the frontside electrical RDL and the backside electrical RDL.

9. The optical wafer-level package of claim 1, wherein the optical transmitter comprises a multi-channel optical transmitter that is arranged for providing optically modulated output data signals and the optical receiver comprises a multi-channel optical receiver that is arranged for receiving optically modulated input data signals.

10. The optical wafer-level package of claim 1, wherein at least one of the optical transmitter and the optical receiver are mechanically coupled to the frontside electrical RDL.

11. The optical wafer-level package of claim 1, wherein the frontside electrical RDL at least partially defines at least one of:
a transmitter aperture for the optical transmitter; and
a receiver aperture for the optical receiver.

12. The optical wafer-level package of claim 11, further comprising a transparent element arranged within at least one of the transmitter aperture and the receiver aperture.

13. The optical wafer-level package of claim 1, further comprising at least one of:
a transmitter optic optically coupled to the optical transmitter; and
a receiver optic optically coupled to the optical receiver.

14. The optical wafer-level package of claim 1, further comprising at least one of:
optical transmitters at least partially embedded within the molding compound layer and electrically coupled to the frontside electrical RDL, each optical transmitter arranged for providing a respective optically modulated output data signal; and
optical receivers at least partially embedded within the molding compound layer and electrically coupled to the frontside electrical RDL, each optical receiver arranged for receiving a respective optically modulated input data signal.

15. The optical wafer-level package of claim 1, wherein the optical wafer-level package is adapted to optically couple with a waveguide.

16. The optical wafer-level package of claim 1, wherein the optical wafer-level package is adapted to optically couple with a planar lightwave circuit (PLC).

17. The optical wafer-level package of claim 1, wherein the backside electrical RDL is arranged to electrically couple with a circuit substrate.

18. The optical wafer-level package of claim 1, further comprising an interposer that is optically coupled with at least one of the optical transmitter and the optical receiver.

19. The optical wafer-level package of claim 18, wherein the interposer is mechanically coupled to the frontside electrical RDL.

20. The optical wafer-level package of claim 1, further comprising vias arranged within the molding compound layer, the vias electrically coupling the frontside electrical RDL with the backside electrical RDL.

21. The optical wafer-level package of claim 1, further comprising an optical adhesive arranged on or above the frontside electrical RDL.

22. The optical wafer-level package of claim 1, wherein the optical wafer-level package includes an optical chip-scale package, the optical chip-scale package comprising the frontside electrical RDL, the molding compound layer, and at least one of the optical transmitter and the optical receiver.

23. An optical assembly comprising:
an optical waveguide; and
an optical wafer-level package optically coupled to the optical waveguide, the optical wafer-level package comprising:
a frontside electrical redistribution layer (RDL);
a molding compound layer, the optical wafer-level package further comprising at least one of:
an optical transmitter at least partially embedded within the molding compound layer, optically coupled to the optical waveguide, and electrically coupled to the frontside electrical RDL, the optical transmitter arranged to provide an optically modulated output data signal to the optical waveguide; or
an optical receiver at least partially embedded within the molding compound layer, optically coupled to the optical waveguide, and electrically coupled to the frontside electrical RDL, the optical receiver arranged to receive an optically modulated input data signal from the optical waveguide; and
a backside electrical RDL electrically coupled on one end to the frontside electrical RDL by vias and on another end to a circuit substrate via solder, wherein at least one of the optical transmitter and the optical receiver is arranged between the frontside electrical RDL and the backside electrical RDL and wherein the backside electrical RDL is separated from the at least one of the optical transmitter and the optical receiver by the molding compound layer.

24. The optical assembly of claim 23, wherein the optical waveguide includes a first optical fiber optically coupled to the optical transmitter and a second optical fiber optically coupled to the optical receiver.

25. The optical assembly of claim 24, further comprising a mold mechanically coupled to the first optical fiber and the second optical fiber.

26. The optical assembly of claim 23, further comprising an optical substrate that includes the optical waveguide, the optical wafer-level package mechanically coupled to the optical substrate.

27. The optical assembly of claim 26, further comprising a planar lightwave circuit that includes the optical substrate.

28. The optical assembly of claim 23, further comprising an interposer that is optically coupled with at least one of the optical transmitter and the optical receiver and mechanically coupled to the frontside electrical RDL.

29. A method comprising:
applying a molding compound to a plurality of opto-electronic dies, each opto-electronic die arranged with a respective optically active surface facing a carrier;
applying a respective backside electrical redistribution layer (RDL) to each opto-electronic die, wherein the applying the respective backside electrical RDL comprises coupling a respective backside electrical RDL of at least one of the opto-electronic dies with at least a circuit substrate and a respective frontside electrical RDL and wherein the respective backside electrical RDL is separated, by the molding compound, from at least one of an optical transmitter and an optical receiver arranged between the respective frontside electrical RDL and the respective backside electrical RDL;
exposing, by removing the carrier, the respective optically active surfaces;
applying a respective frontside electrical redistribution layer (RDL) to each opto-electronic die; and
separating, by cutting the molding compound, the plurality of opto-electronic dies into individual opto-electronic dies.

30. The method of claim 29, further comprising coupling a respective frontside electrical RDL of at least one of the individual opto-electronic dies with at least an optical substrate, the coupling including at least one of mechanically coupling and electrically coupling the respective frontside electrical RDL with the optical substrate.

31. The method of claim 29, wherein the coupling the respective backside electrical RDL includes at least one of mechanically coupling and electrically coupling the respective backside electrical RDL with the circuit substrate.

32. The method of claim 29, wherein the applying the molding compound comprises applying an optically transparent molding compound to the plurality of opto-electronic dies.

* * * * *